US009323696B2

(12) United States Patent
Johnson et al.

(10) Patent No.: US 9,323,696 B2
(45) Date of Patent: *Apr. 26, 2016

(54) DATA SECURITY SYSTEM

(71) Applicant: ClevX, LLC, Kirkland, WA (US)

(72) Inventors: Simon B. Johnson, Bonney Lake, WA (US); Lev M. Bolotin, Kirkland, WA (US)

(73) Assignee: ClevX, LLC, Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/480,283

(22) Filed: Sep. 8, 2014

(65) Prior Publication Data

US 2014/0380011 A1 Dec. 25, 2014

Related U.S. Application Data

(63) Continuation of application No. 12/162,123, filed as application No. PCT/US2007/001866 on Jan. 24, 2007, now Pat. No. 8,832,440.

(60) Provisional application No. 60/791,916, filed on Jan. 24, 2006, provisional application No. 60/747,926, filed on May 22, 2006, provisional application No. 60/747,924, filed on May 22, 2006.

(51) Int. Cl.
*H04L 9/08* (2006.01)
*G06F 12/14* (2006.01)
*G06F 21/31* (2013.01)
*G06F 21/78* (2013.01)
*G06F 21/44* (2013.01)

(52) U.S. Cl.
CPC ........ *G06F 12/1466* (2013.01); *G06F 12/1408* (2013.01); *G06F 21/31* (2013.01); *G06F 21/44* (2013.01); *G06F 21/78* (2013.01); *G06F 2212/1052* (2013.01); *G06F 2221/2129* (2013.01); *H04L 9/0813* (2013.01)

(58) Field of Classification Search
CPC . H04L 63/0869; H04L 63/062; H04L 9/3223; H04L 9/08; H04L 9/0813; H04L 9/0838; H04L 9/3271
See application file for complete search history.

(56) References Cited

U.S. PATENT DOCUMENTS

| 5,623,637 | A | 4/1997 | Jones et al. |
| 6,823,451 | B1 | 11/2004 | Gulick et al. |
| 7,272,723 | B1 | 9/2007 | Abbott et al. |
| 2003/0046593 | A1 | 3/2003 | Xie et al. |
| 2003/0163427 | A1 | 8/2003 | Fung et al. |
| 2003/0167393 | A1 | 9/2003 | Yoshida |
| 2005/0154885 | A1 | 7/2005 | Viscom et al. |
| 2005/0158020 | A1 | 7/2005 | Park |

(Continued)

FOREIGN PATENT DOCUMENTS

| EP | 1372080 A1 | 12/2003 |
| GB | 2394326 A | 4/2004 |

(Continued)

*Primary Examiner* — Eleni Shiferaw
*Assistant Examiner* — Paul Callahan
(74) *Attorney, Agent, or Firm* — Ishimaru & Associates LLP

(57) ABSTRACT

A data security system includes providing a unique identification from a first system to a second system; copying the unique identification in the second system by the first system; and unlocking a memory in the first system or the second system only when the unique identifications in the first system and the second system are the same.

10 Claims, 14 Drawing Sheets

(56) References Cited

U.S. PATENT DOCUMENTS

| | | |
|---|---|---|
| 2005/0216774 A1 | 9/2005 | Williams |
| 2006/0015725 A1 | 1/2006 | Voice et al. |
| 2007/0130463 A1 | 6/2007 | Law et al. |

FOREIGN PATENT DOCUMENTS

| | | |
|---|---|---|
| KR | 1020050119751 A | 12/2005 |
| TW | 550926 | 9/2003 |
| TW | I247523 | 1/2006 |
| WO | 0042491 A1 | 7/2000 |
| WO | 2005101977 A2 | 11/2005 |

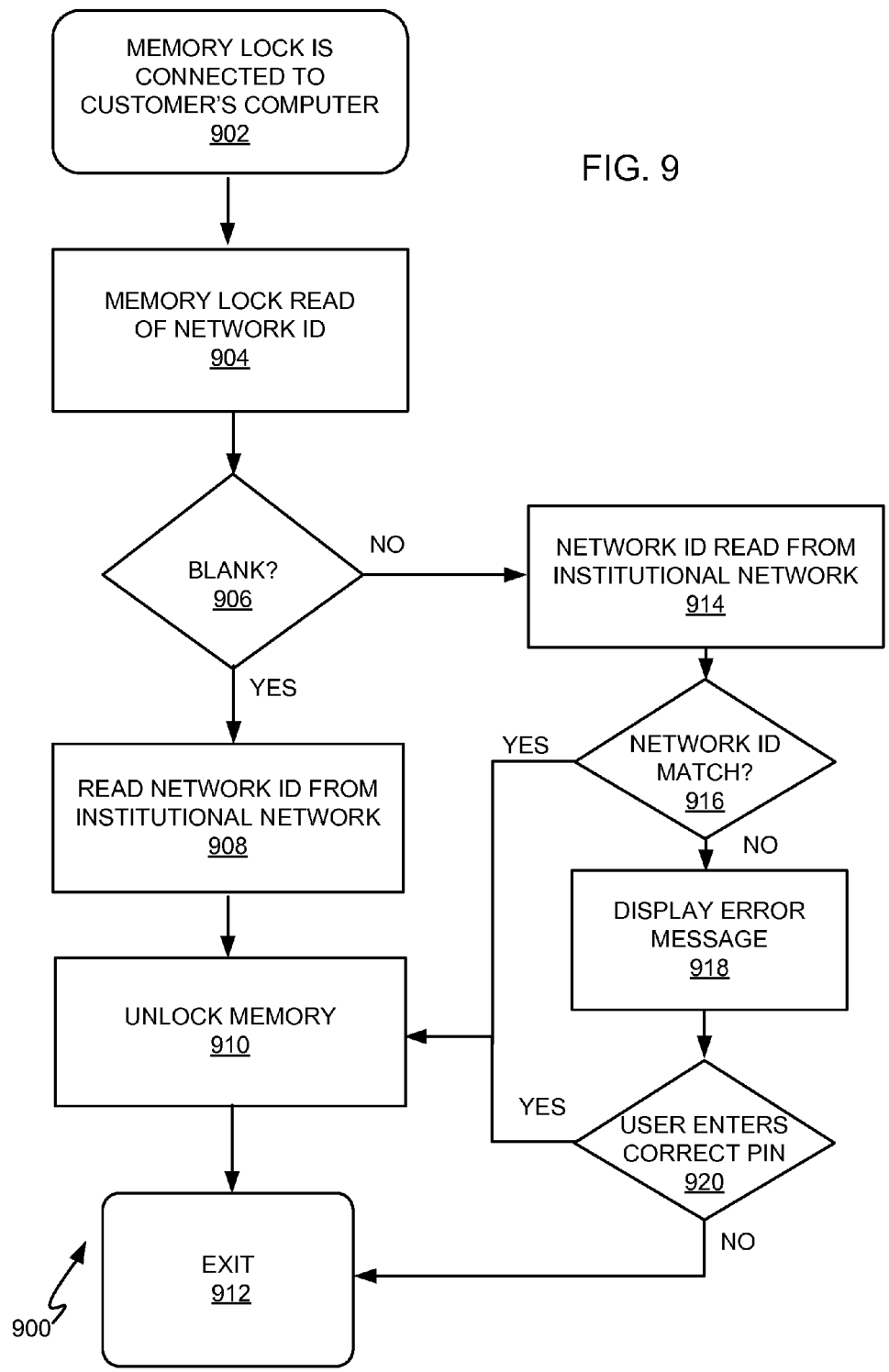

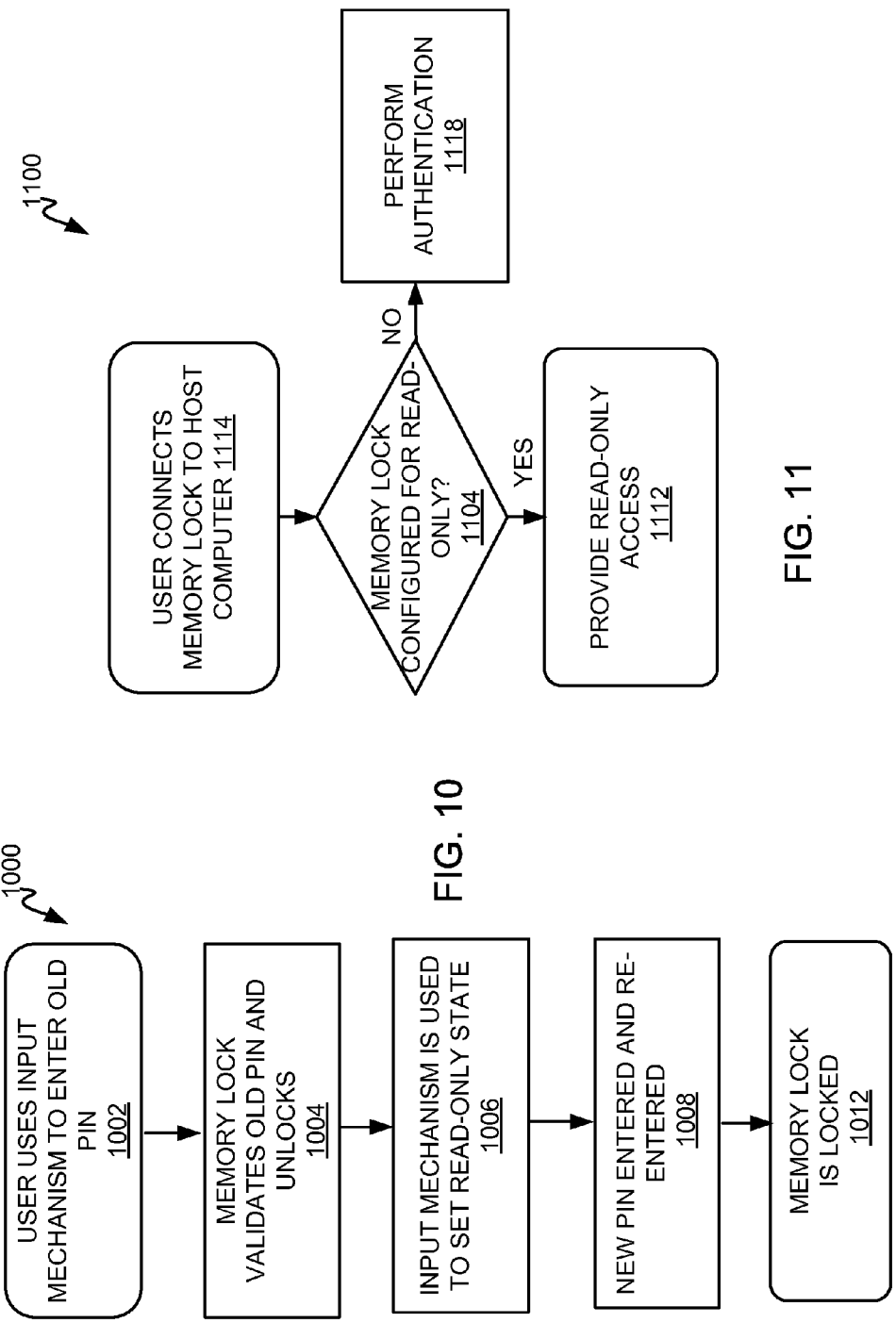

DATA SECURITY SYSTEM

CROSS-REFERENCE TO RELATED APPLICATION(S)

This is a continuation of U.S. patent application Ser. No. 12/162,123, now U.S. Pat. No. 8,832,440, which is the National Stage of International Application No. PCT/US2007/001866, which claims the benefit of U.S. Provisional Application No. 60/761,916 filed Jan. 24, 2006, U.S. Provisional Application No. 60/747,926 filed May 22, 2006, and U.S. Provisional Application No. 60/747,924 filed May 22, 2006.

TECHNICAL FIELD

The present invention relates generally to electronic devices, and more particularly to data security systems.

BACKGROUND ART

Security is a critical issue with almost all aspects of computer use. Memory lock systems, such as hard disk drives on computers, contain valuable information which is vulnerable to data theft. A great deal of money and effort is being applied to guarding personal, corporate, and government security information.

As portable memory storage devices have become smaller, easier to lose, more ubiquitous, cheaper, and larger in memory capacity, they have come to pose extraordinary security problems. It is now possible to download massive amounts of information surreptitiously into portable memory storage devices, such as universal serial bus flash and micro drives (USBDs), cellphones, camcorders, digital cameras, iPODs, MP3/4 players, smart phones, palm and laptop computers, gaming equipment, etc.

More specifically, there are millions of USBDs being used for backup, transfer, intermediate storage, and primary storage into which information can be easily downloaded from a computer and carried away. The primary purpose of any USBD is to store and retrieve that "portable content", which is data or other information tied to an owner and not to a particular computer. A host computer is only a way to access and manipulate the portable content. USBDs are commonly connected to different computers in various environments that are security-uncontrolled and potentially security-hostile.

The affected user community is huge. Every aspect of society is already vulnerable to security leaks and data compromise due to USBDs being lost or stolen along with the information they contain. Because many memory lock systems lack the necessary security, financial databases, medical records, business records, national security information, in short any confidential information, can be exposed and distributed to unauthorized individuals. Private, government, military, and corporate institutional users are all concerned with being able to secure information on portable, easy-to-lose or steal USBDs.

The most common means of providing mass storage security on a computer is to incorporate a password that is accessed via a software application. Password security provides little deterrent to anyone willing to use readily available hacking techniques to get at the data. There are a number of current methods used to gain access to secure memory lock systems, such as key loggers and universal serial bus (USB) "sniffers." These can be installed on a target computer without the user's knowledge. Once a password or security exchange has been captured, it can then be sent to a malicious source.

More recently, biometric password systems have been incorporated into some memory lock systems and other computer peripherals, like keyboard, mouse, dedicated security devices, etc. As noted in many sources, even the manufacturers of these biometric protected devices are not willing to guarantee security.

In industry, while password and biometric systems are capable of protecting mass storage content, they can hinder corporate productivity. In an effort to prevent identity theft and unauthorized access to computer systems, it is industry practice to use different login names and passwords for each unique account. In addition, it is common practice to change passwords at regular intervals. But this is time consuming, requires highly qualified information technology (IT) administration, and causes problems when passwords are forgotten.

Information cannot easily be exchanged within an organization as passwords need to be shared in order to access shared systems. A biometric shared system must learn the "fingerprints" of everybody that needs access.

Since information is easily transported outside a facility, institutions are creating policies that prohibit the use of portable memory storage devices within the confines of an institutional wide network and with company owned equipment. The fear is that portable memory lock systems can pass through conventional security screens. Thus, it becomes very easy for confidential information to get transferred to one of these devices, leave the premises, and get lost or stolen.

Some companies offer prevention with "port management" techniques, for example, by disabling unwanted peripherals connected to their network with end-point security ("port management") software or epoxy applied to USB ports (to "block" the ports). End-point security software grants permission for authorized USBDs while rejecting all others. All these solutions still present problems.

Solutions to these problems have been long sought but prior developments have not taught or suggested any solutions and, thus, solutions to these problems have long eluded those skilled in the art.

DISCLOSURE OF THE INVENTION

Embodiments of the present invention provide a data security system, which includes providing a unique identification from a first system to a second system; copying the unique identification in the second system by the first system; and unlocking a memory in the first system or the second system only when the unique identifications in the first system and the second system are the same.

Certain embodiments of the invention have other aspects in addition to or in place of those mentioned above. The aspects will become apparent to those skilled in the art from a reading of the following detailed description when taken with reference to the accompanying drawings.

BRIEF DESCRIPTION OF THE DRAWINGS

FIG. 9 is a flow chart for an institutional data security system, such as the institutional data security system of FIG. 8, in accordance with another embodiment of the present invention;

FIGS. 10 is a flow chart for a new PIN entry system for a memory lock system, such as the memory lock system of FIG. 1;

FIG. 11 is a flow chart for a read-only-access system for the data security system of FIG. 1 in accordance with another embodiment of the present invention;

BEST MODE FOR CARRYING OUT THE INVENTION

Figure 1:
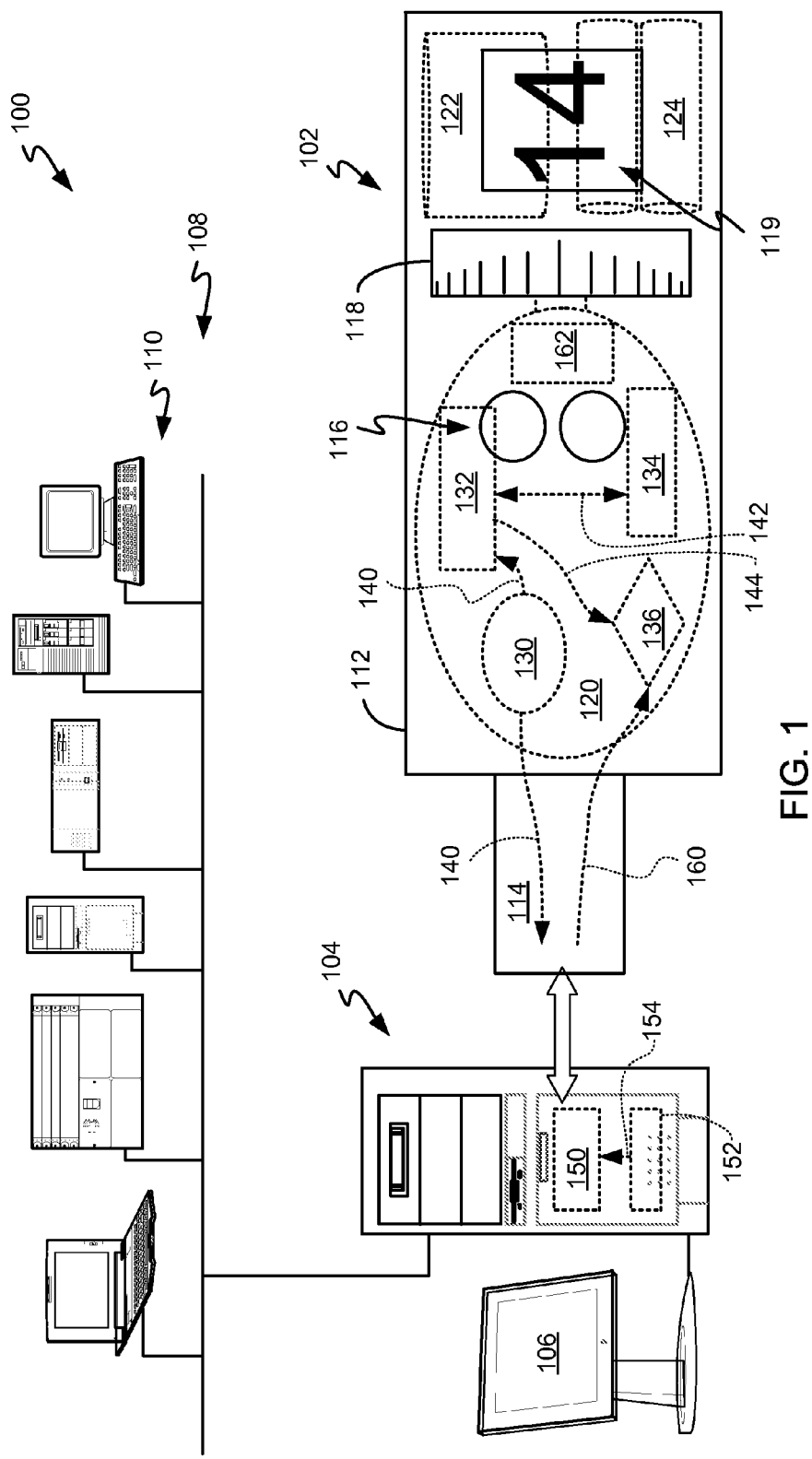
FIG. 1 is a schematic of a data security system in accordance with an embodiment of the present invention.

The following embodiments are described in sufficient detail to enable those skilled in the art to make and use the invention. It is to be understood that other embodiments would be evident based on the present disclosure, and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

Likewise, the drawings showing embodiments of the apparatus/device are semi-diagrammatic and not to scale and, particularly, some of the dimensions are for clarity of presentation and are shown greatly exaggerated in the drawing FIGS.

Similarly, the drawings generally show similar orientations of embodiments for ease of description, but this is arbitrary for the most part. Generally, the various embodiments can be operated in any orientation.

For reasons of convenience and not limitation, the term "drive system" refers to a memory lock system (such as solid-state, e.g. Flash or moveable media, e.g. hard disk drives) or other downloadable computer memory, and the term "USBD" refers to a portable memory storage device. The term "system" as used herein refers to and is defined as the method and as the apparatus of embodiments of the present invention in accordance with the context in which the term is used.

For any USBD containing sensitive information, it is critical that a security system be self-contained and aware of its external environment.

In various embodiments of the present invention, one of the self-contained security features is an electromechanical mechanism that requires physical manipulations (i.e. entering a combination, biometric identification (ID), or personal identification number (PIN)) in order to activate on-board memory. Until the self-contained security system is activated, the memory of the USBD cannot be written to, interrogated, or read from by any electronic product/device/instrument/equipment the present invention is a part of or to which it may be connected.

Unlike other solutions that are on the market presently, embodiments of the present invention are self-contained, and integrated with an internal memory (either portable or "internal" to the bigger assembly) in an electronic device. A host computer (for example, laptop, smartphone, cell phone, computer/computing device, gaming device that has a computer/microprocessor, etc. etc.) does not need to know there is anything special about the device. In this sense, it is independent of operating systems, drivers, applications and computer platforms. It is applicable for use on an embedded system such as a navigation system in a military tank, or other military, commercial, and private systems.

Embodiments of the present invention solve some of the following problems associated with current security/protection methods:

Eliminates the need for an external computer to establish security: locking is self-contained and security depends solely on the memory device itself and its resident hardware/software.

Eliminates the need for a complex and error-prone configuration procedure to establish security.

Prevents password grabbing, which is common in security-questioned environments (e.g. internet café, kiosks, many national-security applications, etc.).

Solves security problems that are platform-specific (e.g. security flaws in various Microsoft™ and other programs), because the device is platform-independent.

Due to platform independence, data can be moved between different operating systems, and various machines, instruments, and any embedded piece of equipment.

In application as a "portable memory" device (such as an external memory device exemplified by a flash or micro drive), it is attached to a communication port of the PC (for example, USB port). To the computer, this is simply a storage device. However, it has a lock that cannot be accessed from the computer. The memory device remains inoperable until it recognizes the correct combination of graphics, such as numbers and/or letters. In some of the embodiments, the operator does not enter numbers or letters. Access can be attained by pressing colored or numbered/lettered buttons, or pressing a single button with variable durations. The latter works, for example, by pressing a button and waiting for an LED to blink. A combination is created, for example, by pressing the button, waiting for 3 blinks, releasing, pressing and waiting for 2 blinks, etc. When the correct sequence has been entered, the memory device unlocks and becomes operable. This device could also be in a form that is password protected (sometimes in addition to a mechanical lock).

For some applications, the "lock" can have a "timer" which can be set to keep the lock "locked" for a certain period of time or until a certain date. The memory lock system must remain attached to the computer to view its contents. If the memory lock system is unplugged, the memory lock system becomes locked again. For other applications based on the "timer", the memory lock system may have a "timing" feature that will count the time once the device is unlocked. After a specific time limit of inactivity, such as a few minutes, when the computer is not accessing the USBD, the memory lock system will automatically lock itself. The user is then required to unlock the device again using the combination.

One of the possible uses of embodiments of the present invention is to store/manage login credentials. Of course, there are many other uses such as storage of "portable content", medical records, digital pictures, financial/corporate data, military applications, multifactor authentication for online banking, etc.

Also, various embodiments of the memory lock system are capable of storing any file containing confidential information (personal, financial, medical records, etc.). Confidential files can be accessed like any other file on a computer as long as the memory device is unlocked.

Various embodiments of the present invention could be used for controlled access to many computing devices, electronic products, and applications, e.g., videogames for kids, digital music players, iPODs, camcorders, laptops, smart and cell phones, palm and laptop computers, etc. These embodiments could also be used by financial institutions to provide a "physical" token for multifactor authentication systems.

In various embodiments of the present invention, a drive system includes a network/computer system for providing a unique identifier to the drive system, a private hashing function for authenticating the network/computer system, and a manipulable mechanism for unlocking and locking a USBD.

In various other embodiments of the present invention, attributes of a drive system that can be embraced in an institutional environment are that it:

1. Protects information, yet allows a controlled access environment when outside the controlled access environment of an institution.
2. Can be freely exchanged inside the controlled access environment.
3. Is secured to a particular user's computer system.
4. Eliminates the need for an external computer to establish security: locking is self-contained and access control depends solely on the memory lock system itself and its resident hardware/firmware/software.
5. Reduces password proliferation as the memory lock system is able to recognize a safe environment and thus, grants access without a challenge/response from the user.
6. Can be unlocked outside the network system via authentication by using a self-contained input mechanism.
7. Does not rely on end-point security applications to encrypt/decrypt content.

Due to its self-contained nature, security in various embodiments of the present invention is platform independent so that data can be moved between differing operating systems, machines, instruments, and embedded equipment.

When attached to its host, the USBD remains inoperable until it is able to authenticate its host or recognize a correct combination (PIN) entered via its on-board manipulable input mechanism.

Referring now to FIG. 1, therein is shown a schematic of a data security system 100 in accordance with an embodiment of the present invention.

The data security system 100 includes a memory lock system 102, a host computer system 104 with a display unit 106, and an optional institutional network system 108 with optional computer systems 110 as part of the optional institutional network system 108.

The memory lock system 102 includes a body 112 having a connector 114, which could be a USB connector. The body 112 includes an input status indicator 116, such as LEDs, and a manipulable input mechanism 118, such as a thumb-wheel. The manipulable input mechanism 118 is next to a display unit 119.

Internally, the body 112 contains a controller 120 connected to the host computer system 104, the manipulable input mechanism 118, and a memory 122, such as a flash memory. Optional batteries 124 power the memory lock system 102. The batteries 124 are optional because power for the memory lock system 102 could also come from the host computer system 104 (with or without a cable).

The controller 120 contains a random number generator unit 130, a hashing unit 132, a host identification (ID) unit 134, and a checking unit 136.

The random number generator unit 130 provides a random seed 140 to the connector 114 and to the hashing unit 132. The host ID unit 134 provides a host ID number 142 to the hashing unit 132. The hashing unit 132 takes the random seed 140 and the host ID number 142 to provide a hashed number 144 to the checking unit 136.

The connector 114 is connectable to the host computer system 104, which contains a host application 150 and a host ID unit 152. The random seed 140 is provided to the host application 150 along with a host ID number 154 to provide a host's hashed result 160, which is provided by the connector 114 to the checking unit 136. Only when the hashed number 144 and the host's hashed result 160 are the same or matches will the controller 120 will unlock access to the memory 122. Security is not based on a USB connection—portions are hidden from host access requests. Various forms of security include:

Encryption applied to data residing in memory

Hiding of data by the memory chip. Memory chip is not fully accessible until controller is able to authenticate itself Disabling the communication port.

The host application 150 contains a hashing unit, which is the same as the hashing unit 134 in the memory lock system 104. The host application 150 can reside permanently on the host computer system 104 or be loaded temporarily from the memory lock system 102. In the latter case, the memory lock system 102 contains a public partition that causes the host computer 104 to auto-load and run directly from the memory lock system 102.

User authentication for the memory lock system 102 is provided by a "physical" locking mechanism (for example, based on an electro-mechanical mechanism). This is how the thumb-wheel implementation would work as shown in FIG. 1. As an example only, its implementation is illustrated with a "portable memory" system, such as the memory lock system 102, equipped with a communication port (e.g., a USB port or connector). It is understood that very similar mechanisms can be incorporated within a digital camera, internal hard drive of the computer, smart phone, palm computer, digital music players, etc.

The memory lock system 102 is normally off to conserve battery power.

When the manipulable input mechanism 118 is manipulated, the controller 120 wakes up and activates the display unit 119.

The display unit 119 initially shows "00" and increments 01, 02, 03 . . . 98, 99 as the manipulable input mechanism 118 is manipulated.

Like common combination locks, it could take a sequence of 3 numbers to unlock. For example, a combination such as 22, 68, and 17 (of course, the sequence could have more or less numbers/letters).

The manipulable input mechanism 118 is manipulated until the number 22 appears on the display unit 119.

The user then manipulates the manipulable input mechanism 118 differently, for example with a thumb-wheel, reverses the direction of the wheel. The controller detects the change in direction and changes the display unit 119 to 00 again.

Manipulation continues until 68 appears in the display unit 119.

The manipulation is changed until 17 appears.

The memory lock system 102 is now unlocked.

Three 2-digit numbers gives 1,000,000 possible combinations, and with 3-digit numbers, there are 1,000,000,000 possible combinations.

Any electrical tampering will render the memory lock system 102 inoperable. While the unlocking mechanism is electro-mechanical, it is actually controller firmware that is monitoring the input.

If the memory lock system 102 is plugged in without unlocking, it will not function.

The following are features/functions of different embodiments of the present invention:

A small package that can be kept on a key chain, in a wallet, or into a larger assembly; e.g., a laptop.

Data is encrypted to prevent disassembly and reverse engineering. Software resident on the memory lock system 102 performs encryption and de-encryption.

The memory lock system 102 operates with all computer type systems including desktops, laptops, and handhelds and embedded systems.

Can be backed up to a second memory lock system.

The memory lock system 102 has an electromechanical lock so user must enter numbers/letters/graphics similar in nature to existing combination locks. The memory lock system 102 can additionally have a software password and can also have a timer.

With an appropriate software application, the memory lock system 102 can automatically enter login credentials.

The memory 122 can store all types of personal data and information.

Allows storage of credit card information.

Able to store files of any type.

Amount of data is limited only by the size of the memory 122 and memories are constantly increasing in size.

The memory 122 can exist in any form including, but not limited to, RAM, Flash, and rotating disk media.

An internal power source, the optional batteries 124, allows unlocking while detached from a computer.

The memory lock system 102 may or may not have a visual status indicator, such as the input status indicator 116.

The memory lock system 102 may have a display unit 119. With appropriate software, the memory lock system 102 can have "one click" login.

The memory lock system 102 can be used as external memory for cell phones (e.g. storage for phone book).

A security fuse in the controller 120 will be blown to prevent reverse engineering.

Hacking attempts are detected by the controller 120. Internal communication channels will remain closed even if correct sequence is subsequently entered.

If hacking is detected, the memory lock will reset itself for a later time (e.g. 1-hour) when it will return to normal operation, will be set to erase itself, or operate in some other fashion.

Hacking is detected by X number of unsuccessful tries (e.g., 10). Enough to account for normal operator mistakes but short enough to prevent unauthorized entry. The overall software anti-hacking algorithm is not published in the User Documentation and is not available to public.

The memory lock system 102 can be pre-set by the factory so it cannot be changed.

The memory lock system 102 can be pre-set by the factory with an initial lock/unlock combination which can be changed by the operator once the memory lock system 102 is unlocked.

The memory lock system 102 can be pre-set by the factory with an initial lock/unlock combination which can be changed remotely by the factory in the event the combination is forgotten.

The memory lock system 102 can have multiple PINs combinations (for the user and others)

The controller 120 of the memory lock system 102 further contains an authentication unit 162 capable of authenticating various physical and biometric inputs. In addition to numbers and words, the authentication unit 162 can authenticate fingerprints or retinal prints by conventional means. Some of the means are hereinafter described.

Figure 2:
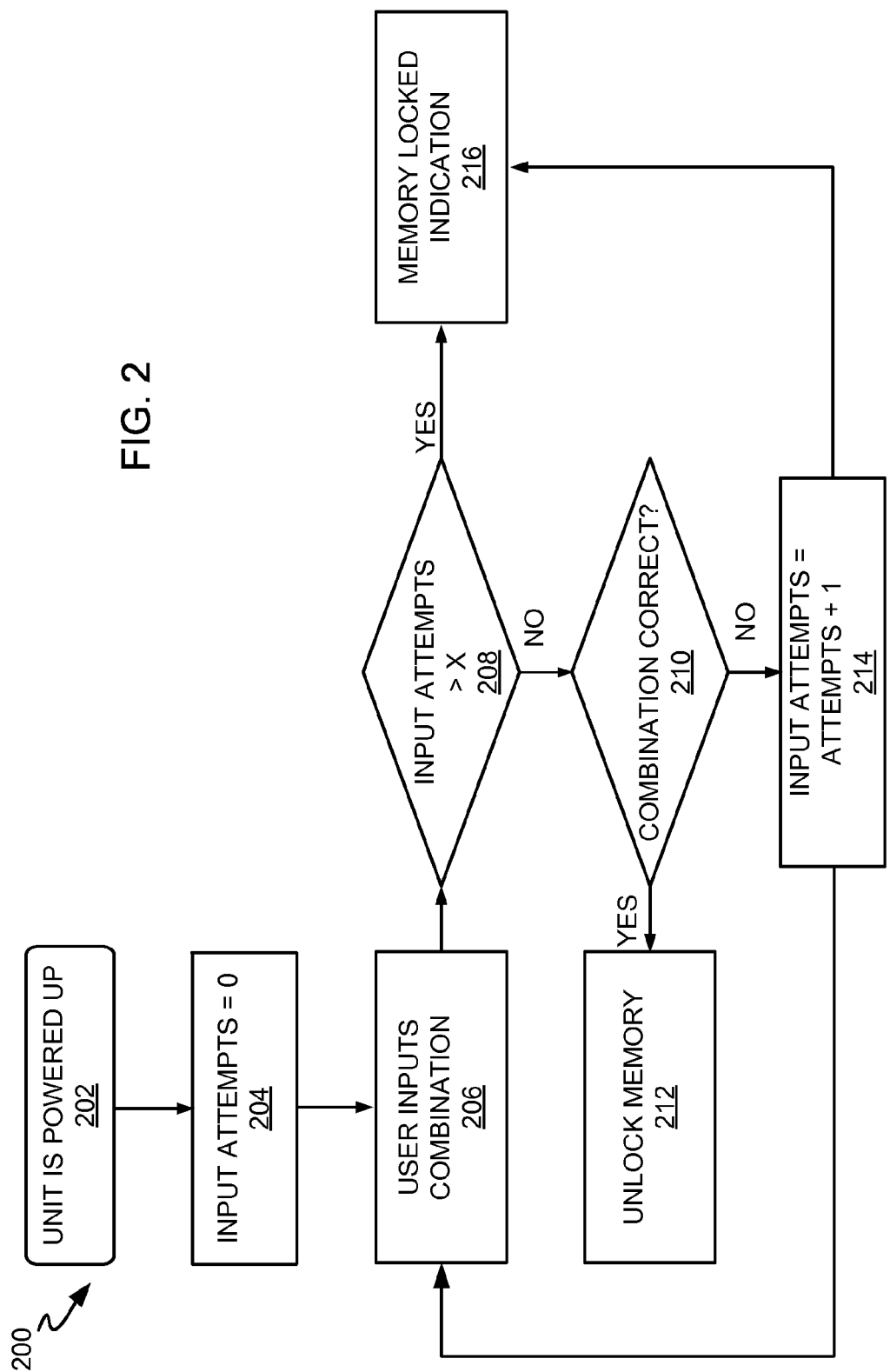
FIG. 2 is a flow chart of an anti-hacking system for the data security system of FIG. 1 in accordance with another embodiment of the present invention.

Referring now to FIG. 2, therein is shown a flow chart of an anti-hacking system 200 for the data security system 100 of FIG. 1 in accordance with another embodiment of the present invention.

The anti-hacking system 200 starts when a unit, such as the memory lock system 102, is powered up in a block 202. An input attempt register is set to 0 in a block 204.

A user inputs a combination in a block 206, and the number of attempts at inputting the combination is checked in an input attempts >X in a decision block 208. X here is an arbitrary number set to be the maximum number of attempts.

As long as the number of input attempts is less than the number set in the decision block 208, the combination will be checked in a decision block 210. If the combination is correct in the decision block 210, the memory will be unlocked in a block 212.

If the combination is incorrect in the decision block 210, the input attempts will be incremented in input attempts equals attempts plus 1 in a block 214. With the incorrect combination, a memory locked indication will be provided in a block 216, and the flow chart returns to the user inputs combination in the block 206 to allow the user to input the combination again.

Once the input attempts is greater than the set number in the decision block 208, the memory locked indication in the block 216 will be provided and no further user combinations will be accepted.

Basically, the anti-hacking system 200 counts the number of unsuccessful unlocking attempts. When the number of unsuccessful attempts reaches a specified threshold, the unlocking mechanism changes slightly: every combination entry fails (even a valid entry). This mechanism prevents unauthorized entry with no feedback to the hacker as to success or failure.

The memory lock system 102 will again regain operation when:
a) The memory lock system 102 of embodiments of the present invention wakes from sleep mode (battery powered).
b) The memory lock system 102 of embodiments of the present invention is removed and reconnected to a USB port (for a battery-less embodiment).
c) Input Attempts is reset.

Figure 3:
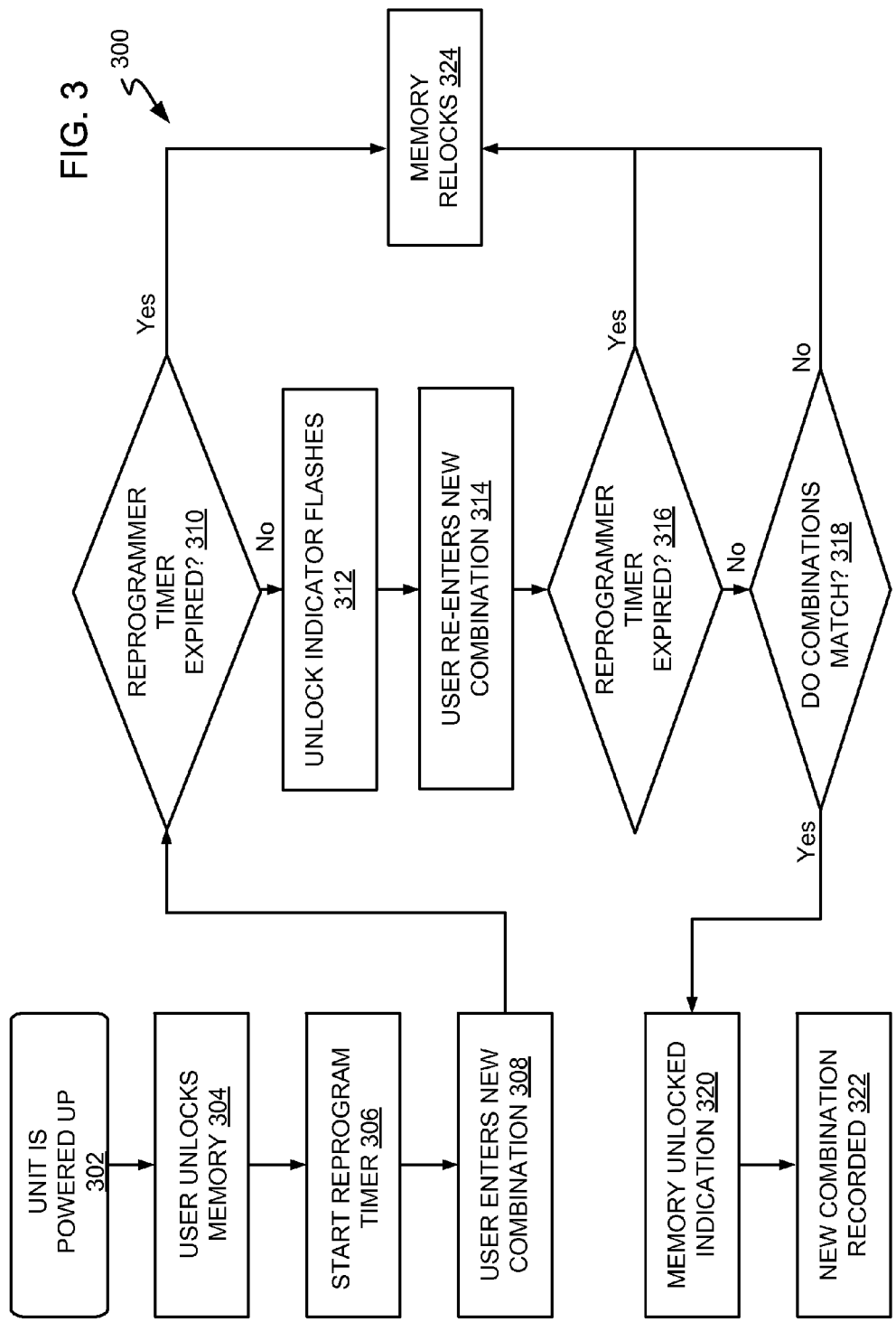
FIG. 3 is a flow chart for a combination reconfiguring system for the data security system of FIG. 1 in accordance with another embodiment of the present invention.

Referring now to FIG. 3, therein is shown a flow chart for a combination reconfiguring system 300 for the data security system 100 of FIG. 1 in accordance with another embodiment of the present invention.

The combination reconfiguring system 300 starts when a unit, such as the memory lock system 102, is powered up in a block 302. The user unlocks the memory in a block 304 in accordance with a procedure similar to that shown in the anti-hacking system 200 of FIG. 2.

The unlocking of the memory starts a reprogram timer in a block 306. The user then enters a new combination in a block 308 and a check is made to see if the reprogram timer has expired in a decision block 310.

If the reprogram timer has not expired in the decision block 310, an unlocked indicator flashes in a block 312. At this point the user re-enters the new combination in a block 314. Again a check is made to see if the reprogram timer has expired in a decision block 316.

If a reprogram timer has not expired in the decision block 316, a check is made to see if the two new combinations match in a decision block 318.

If the two new combinations match in the decision block 318, a memory unlocked indication is provided in a block 320 and the new combination is recorded in a block 322.

If the reprogram timer expires before the new combination is entered or re-entered, or if the combinations do not match, the memory relocks in a block 324.

In embodiments of the present invention, a new combination must be entered and verified within a short window of opportunity. This is to prevent unattended and unlocked units from being stolen and reconfigured. Of course, there are several embodiments of how the combination reconfiguring system 300 is designed and built:
(1) The combination reconfiguring system 300 can be preconfigured at the factory (and can not be reprogrammed), or
(2) The combination reconfiguring system 300 can be designed to allow the user to reconfigure the combination once the unit is unlocked, and
(3) The combination reconfiguring system 300 can be designed to allow remote factory reconfiguration in the event a user forgets the combination once it is determined that the person is an authorized user.
(4) Multiple combinations can be used as well.

In a further embodiment of the combination reconfiguring system 300 used, for example to reset the combination of a secure smart drive, the following is done:
1. The combination reconfiguring system 300 is delivered with a preconfigured combination. This combination must be used in order to unlock the combination reconfiguring system 300 for the first time. The original combination can be retained by the customer or changed.
2. The first step in changing the assigned combination is to unlock the combination reconfiguring system 300.
3. Once unlocked, a reset mechanism can be activated; e.g., a reset button on the bottom of the memory lock system 102 is pressed and an LED will Flash to indicate that the memory lock system 102 is ready accept a new combination.
4. The desired combination is then entered, and the reset button is pressed again. If a mistake was made during entry, the memory lock system 102 is unplugged from the USB port and restarted. The original combination is still active.
5. The reset button is pushed again when the entry is satisfactory. The combination has now been changed.

Figure 4:
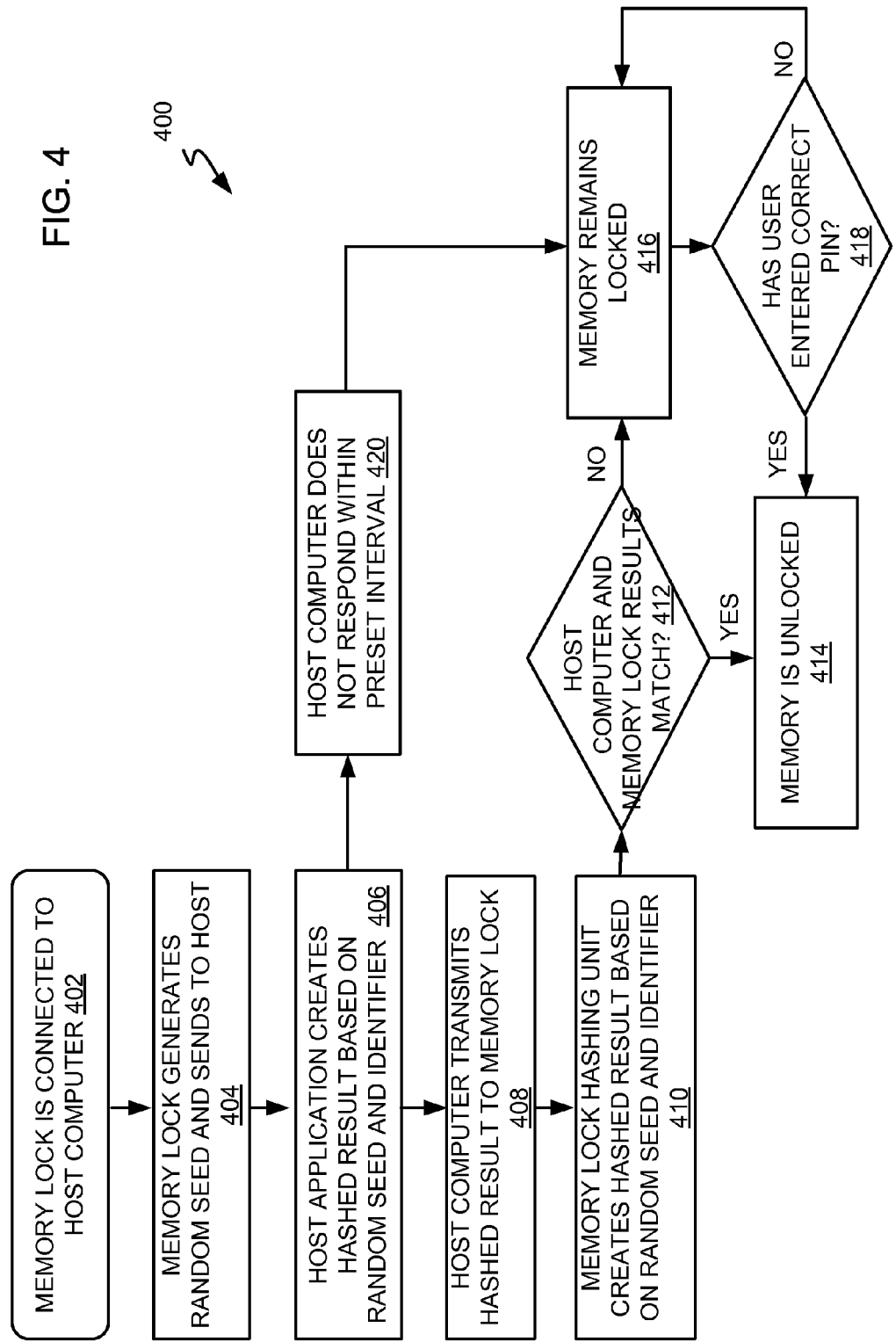
FIG. 4 is a flow chart of an institutional memory lock system for the data security system of FIG. 1 in accordance with another embodiment of the present invention.

Referring now to FIG. 4, therein is shown a flow chart of an institutional memory lock system 400 for the data security system 100 of FIG. 1 in accordance with another embodiment of the present invention.

A user connects the memory lock system 102 to the host computer 104, which is connected to the institutional network system 108 in a block 402. The memory lock system 102 generates the random seed 140 in the random number generator unit 130 and sends it to the host computer system 104 in a block 404.

In the host computer system 104, the host application 150 uses the host ID number 154 from the host ID unit 152 and the random seed 140 from the memory lock system 102 to create a host's hashed results 160 in a block 406.

The host computer system 104 then transmits the host's hashed result 160 to the memory lock system 102 in a block 408.

In the memory lock system 102, the hashing unit 132 uses the host ID 142 from the host ID unit 134 and the random seed 140 from the random number generator unit 130 to create a memory's hashed result 144. The host's hashed result 160 from the host computer system 104 is compared with the memory's hashed result 144 from the memory lock system 102 in the checking unit 136 in a block 410.

A check is made to see if the host computer and the memory block hashed results match in a decision block 412. If the hashed results match in the decision block 412, the memory is unlocked in a block 414.

If the hashed results do not match in the decision block 412, the memory remains locked in a block 416.

As an additional feature, if the host computer system 104 does not respond within a preset interval while the host application is creating the host's hashed results 160 in the block 406, the preset interval in a block 420 will pass and the memory 122 will remain locked in the block 416.

As a further feature, the user may enter a correct PIN number in a decision block 418, and if the PIN number is correct, the memory will be unblocked in the block 414. If the PIN number is incorrect the memory remains locked in the block 416.

The flow chart of the institutional memory lock system 400 shows:
The memory lock system 102 creates the random seed 140 that is used as input to the hashing unit 132.
Both the host computer system 104 and the memory lock system 102 generate a hashed result based on the random seed and host identifier.
If the results from both the host computer system 104 and the memory lock system 102 are the same, the memory lock system 102 unlocks providing complete access.

If the memory lock system 102 is unable to recognize the attached host, it can be unlocked via user authentication.

Authentication is established by the memory lock system 102, not the host.

A host ID is created and transferred to the memory lock system 102 for future reference.

Control and security are managed by the memory lock system 102, not the host.

The memory lock system 102 retains a list of learned hosts.

The hashing unit 132 is used to operate on a random seed and one or more keys (computer/network ID in this case). All types of logical and arithmetic functions may be applied inside the hashing unit 132. The goal is to create a proprietary hashing process that is not easily determined by hacking attempts. Only the host application 150 and the memory lock system 102 for the institution know the hashing algorithm.

A key is a unique value that changes the output of the hashing unit 132. A different key will generate a different result from the hashing unit 132. The key can represent an identifier such as a serial number, login ID, computer ID, product ID, etc. In order for the peripheral device to be authenticated, both the hashing unit 132 and keys need to match. In the present embodiment, the host ID 154 was used as an example of a key.

The process of creating a result is analogous to encryption algorithms used to encrypt/decrypt data. The hashing unit 132 has a number of advantages over existing encryption algorithms:

Unidirectional—the result does not need to be able to generate the seed (decrypt).

Seeds can be of any length, longer=more secure.

Results can be of any length, longer=more secure.

Can be made more cryptic and difficult to reverse engineer.

The memory lock system 102 compares its internal result with that generated by the host application. If a match occurs, the memory lock system 102 is authenticated and access allowed to the computer systems 110 on the institutional network system 108. Since a random seed is used as input, the odds of duplicating the same result, is a function of its length. For example, the odds of repeating the same authentication exchange with a 32 bit seed are 1 in 4,294,967,295. Longer seeds generate larger odds.

Figure 5:
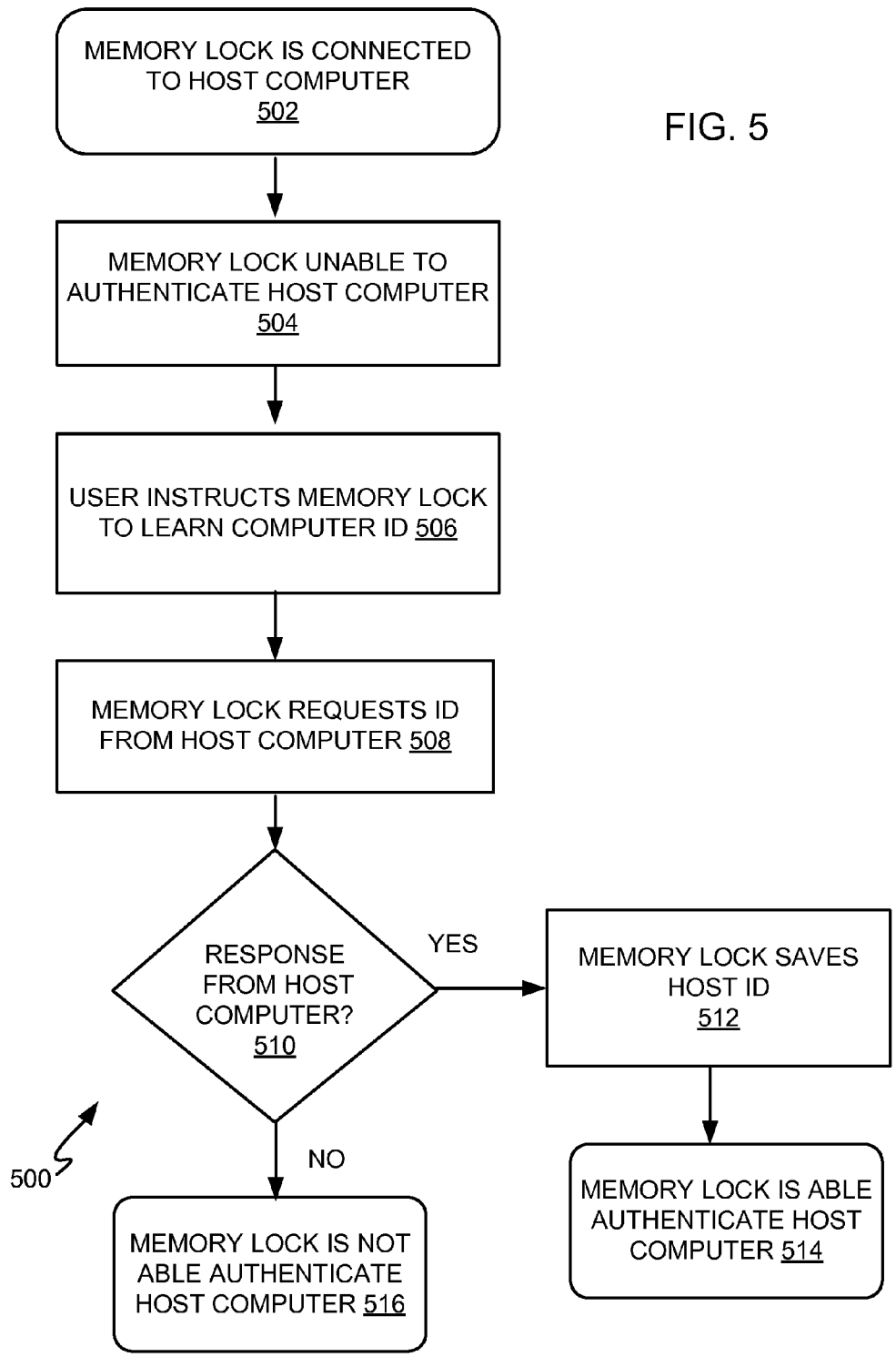
FIG. 5 is a flow chart of an authentication system for the data security system of FIG. 1 in accordance with another embodiment of the present invention.

Referring now to FIG. 5, therein is shown a flow chart of an authentication system 500 for the data security system 100 of FIG. 1 in accordance with another embodiment of the present invention.

The authentication system 500 starts with the memory lock system 102 being connected to the host computer system 104 in a block 502. When the memory lock system 102 is unable to authenticate the host computer system 104 in a block 504, the user has to instruct the memory lock system 102 to learn the host ID 154 in the host ID unit 152 in a block 506.

The memory lock system 102 then requests the host ID 154 from the host computer system 104 in a block 508.

A check is made to see if there is a response from the host computer system 104 in a decision block 510, and if there is, the memory lock system 102 saves the host ID 154 in the host ID unit 134 in a block 512. Thereafter, the memory lock system 102 is able to authenticate the host computer system 104 in a block 514.

If there is no response from the host computer system 104 in the decision block 510, the memory lock system 102 is not able to authenticate the host computer system 104 in a block 516.

Basically, the flow chart of the authentication system 500 shows:

1. Upon initial use, a memory lock system 102 may be "married" to the host computer system 104 in the institutional network system 108.
2. This linking is established by creating an identifier that uniquely identifies its connected environment; e.g., the host ID 154.
3. The host ID 154 is then written to the memory's host ID unit 134.
4. The memory lock system 102 is now ready to provide full access based on a recognized host computer 104.
5. If a memory lock system 102 has been previously married, no special procedures are necessary—the unit is fully functional.
6. If a married memory lock system 102 is accessed outside the institutional network system 108, the memory lock system 102 requires a combination to gain access.

In summary, the memory lock system 102 works like any existing non-protected USBD while accessed within the confines of the company. Once outside its corporate world, the memory lock system 102 acts like a standard memory lock system 102 - a combination is required to access.

Various aspects of the authentication system 500 in the data security system 100 for an institution include:

Allows use of USBDs within a predetermined set of constraints.

Allows use of USBDs outside established constraints provided the correct unlocking sequence is entered.

If the USBD is lost or stolen, its content remains protected.

If the manipulable input mechanism 118 is omitted, the memory lock system 102 can only be accessed within a recognized host/network system. Thus, this embodiment is restricted for use within the confines of the defined network and/or computer system.

Possible authentication parameters include, and are not limited to:

network system

Computer system

User

Any combination of network system, computer system, and user

Figure 6:
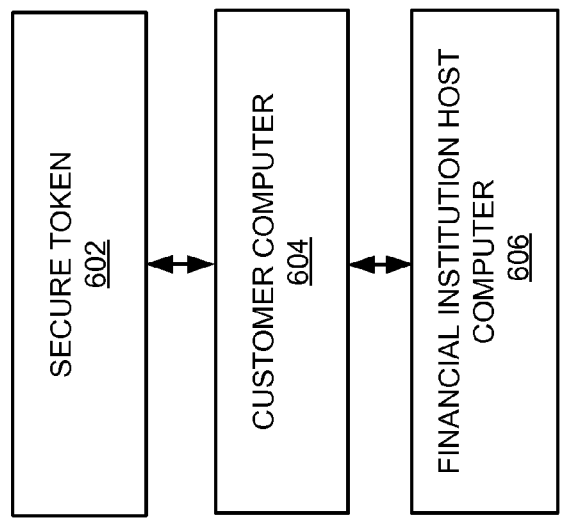
FIG. 6 is a secure token system for the data security system of FIG. 1 in accordance with another embodiment of the present invention.

Referring now to FIG. 6, therein is shown a secure token system 600 for the data security system 100 of FIG. 1 in accordance with another embodiment of the present invention.

The secure token system 600 includes a secure token 602, which is used with a customer's computer 604 to communicate back and forth with a financial institution host 606, as an example.

The memory lock system 102 in this embodiment demonstrates implementation of a two-factor authentication system. For the two-factor authentication system to work it has to comply with the following Rules:

1. A locked token (implemented as the memory lock system 102) cannot exchange information with the financial institution host computer.
2. Once the token (memory lock system 102) is removed from the customer computer, it relocks.
3. The token (memory lock system 102) generates a new authentication code each time the customer account is accessed via currently employed methods used for unsecured tokens on the market.
4. An option exists of entering a login and password although this is unnecessary, as the token won't function unless the correct combination (password, PIN) has been entered.

The secure token system 600 increases security and simplifies customer experience at the same time.

It understood that appearance-wise, the memory lock system 102 could be implemented in many different forms/shapes and combined with different known products (for example, key ring USBD drives, credit card (wallet size) USBD, digital USB/watches, music players, portable memory devices, camcorders, laptops, smart phones, palm computers, etc.)

Figure 7:
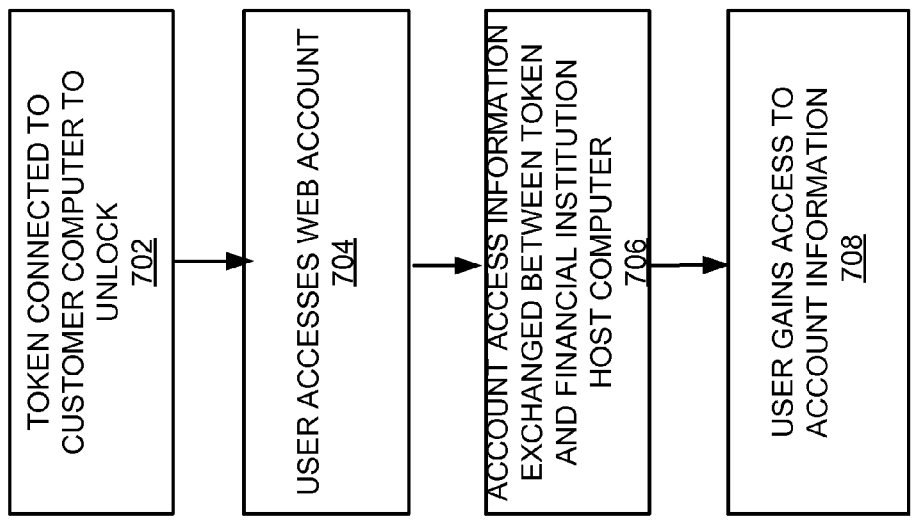
FIG. 7 is a flow chart of a token authentication system for the data security system of FIG. 1 in accordance with another embodiment of the present invention.

Referring now to FIG. 7, therein is shown a flow chart of a token authentication system 700 for the data security system 100 of FIG. 1 in accordance with another embodiment of the present invention. The secure token system 600 of FIG. 6 is used as an example along with the data security system 100 of FIG. 1.

The user connects the secure token 602 or the memory lock system 102 to the customer's computer 604 and unlocks the memory 122 in a block 702.

The user accesses a web account in a block 704 and account access information is exchanged between the secure token 602 and the financial institutional host 606 in a block 706.

The user is then able to gain entry to account information in a block 708.

In another embodiment of the present invention, the memory lock system 102 is incorporated in an institutional computer system, such as one of the computer systems 110 on the institutional network system 108. An institution is defined as any organizational entity, such as a corporation, partnership, joint venture, etc. The example given herein is the financial institutional host 606 like a bank or brokerage firm.

Figure 8:
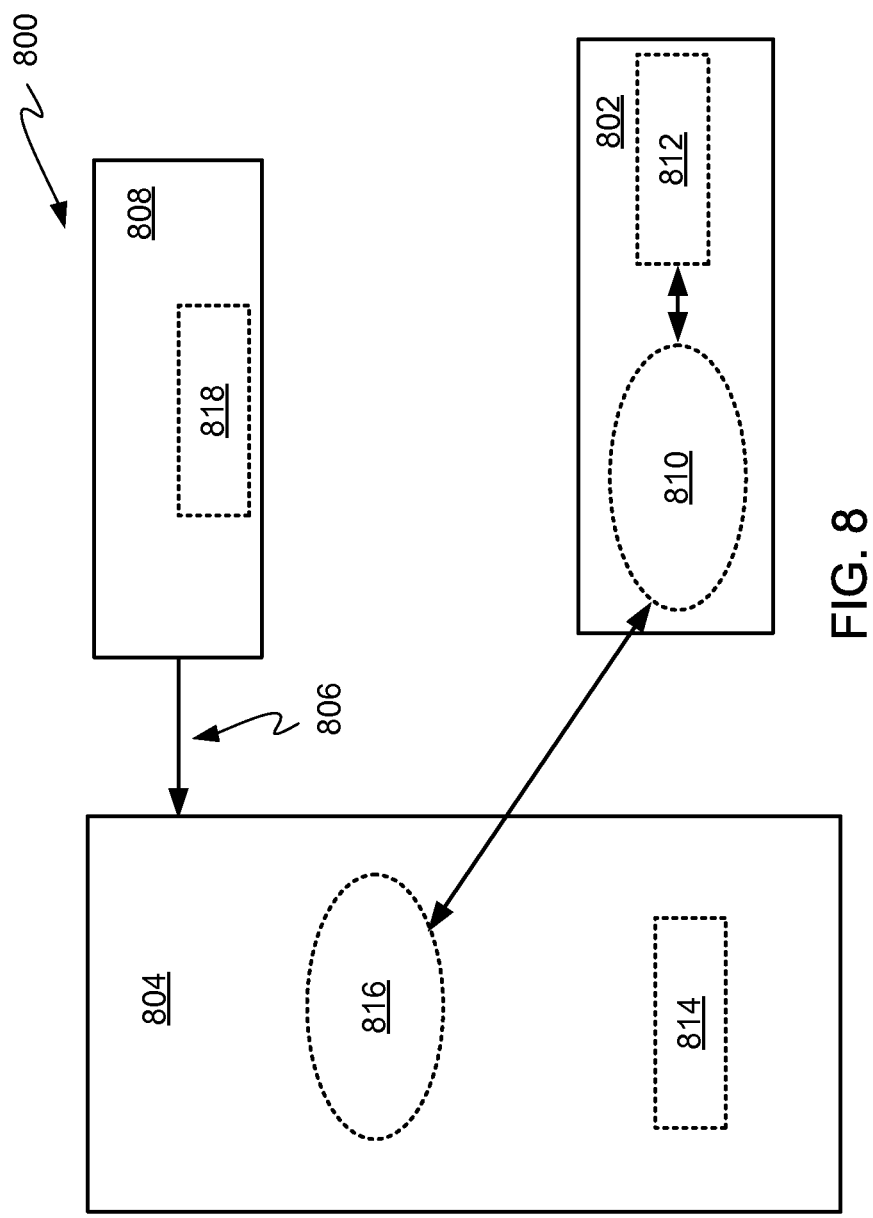
FIG. 8 is an institutional data security system in accordance with another embodiment of the present invention.

Referring now to FIG. 8, therein is shown an institutional data security system 800 in accordance with another embodiment of the present invention.

The institutional data security system 800 uses a memory lock system 802 connectable to a customer computer 804. The customer computer 804 is connectable to an institutional network system 806, which connects to an institutional computer system 808.

The memory lock system 802 includes a controller 810 and a network ID 812.

The customer computer 804 has a computer ID 814 which connects to a memory lock system driver 816. The memory lock system driver 816 is connected to the memory lock system 802 and is further connectable to the institutional network system 806.

The institutional computer system 808 contains a network ID 818 which can be transmitted over the institutional network system 806 to the memory lock system driver 816.

The institutional data security system 800 includes:
1. The memory lock system 802 has a USBD with a hidden partition for ID storage.
2. The memory lock system driver 816 recognizes that this is the memory lock system 802 and not an unprotected USBD.
3. Software in the institutional computer systems 808 creates the network ID 818 that is written to the network ID 812 in the memory lock system 802.
4. If the network ID 818 is not available, the memory lock system 802 becomes married to the customer computer 804.

Referring now to FIG. 9, therein is shown a flow chart for an institutional data security system 900, such as the institutional data security system 800 of FIG. 8, in accordance with another embodiment of the present invention. The institutional data security system 900 begins operation with the memory lock system 802 being connected to the customer computer 804 in a block 902.

The memory lock network ID 812 is read in a block 904 and a check made to see if it is blank in a decision block 906.

If the memory lock network ID 812 is blank in the block 906, the network ID 818 is read from the institutional network system 806 in a block 908.

The program then unlocks the memory in a block 910 and proceeds to exit block 912.

If there is a network ID in the memory lock system 802, the program reads the network ID from the institutional network system 806 in a block 914.

The network IDs are checked to see if they match in a decision block 916 and if they do match, the program proceeds to unlock the memory in the block 910 and then goes to the exit block 912.

If the network IDs do not match in the decision block 916, the program proceeds to display an error message in a block 918.

The user is provided with the opportunity to enter the correct PIN number in a decision block 920 and if the correct PIN number is entered, the program unlocks the memory in the block 910.

If the user enters the incorrect PIN number, the program goes to the exit block 912.

In summary, the institutional data security system 900 works with the memory lock system 802 like any existing non-protected USBD while accessed within the confines of the institution. Once outside the institution, the memory lock system 802 acts like the memory lock system 102 in that a combination is required for access.

Various aspects of the institutional data security system 900 include:
 1. Allows use of USBDs within a predetermined set of constraints.
 2. Allows use of USBDs outside established constraints provided the correct unlocking sequence is entered.
 3. If the USBD is lost or stolen, its content remains protected.

Referring now to FIG. 10, therein is shown a flow chart for a new PIN entry system 1000 for a memory lock system, such as the memory lock system 102 of FIG. 1.

The user uses the manipulable input mechanism 118 to enter the old PIN in a block 1002.

The memory lock system 102 validates the old PIN and unlocks the memory in a block 1004.

The manipulable input mechanism 118 is set to a read only state in a block 1006.

The new PIN is entered and re-entered as a double check in a block 1008, and then the memory lock system 102 with the new PIN is locked in a block 1012.

Referring now to FIG. 11, therein is shown a flow chart for a read-only-access system 1100 for the data security system 100 of FIG. 1 in accordance with another embodiment of the present invention.

The read-only-access system 1100 starts with the user connecting the memory lock system 102 to the host computer system 104 in a block 1114. A check is first made to determine whether the memory lock system 102 is configured for read-only-access in a decision block 1104.

If the memory lock system 102 is configured for read-only-access, then the memory lock system 102 is provided with read-only-access in a block 1112.

If the memory lock system 102 is not configured for read-only-access in the decision block 1104, it is determined that it is necessary to perform authentication in a block 1118.

Thus, it is possible to grant read-only-access while requiring authentication to write (add, edit, or remove) content.

Figure 12A:
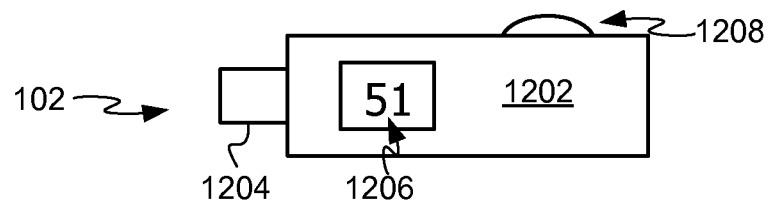
FIG. 12A-12C are various alternate embodiments of the memory lock system for use with the data security system of FIG. 1 or the institutional data security system of FIG. 9.
Figure 12B:
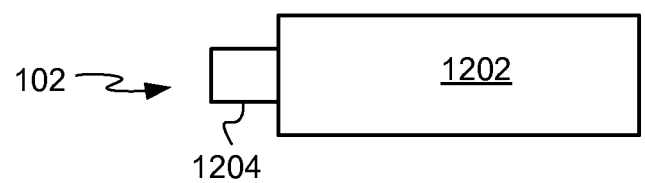
Figure 12C:
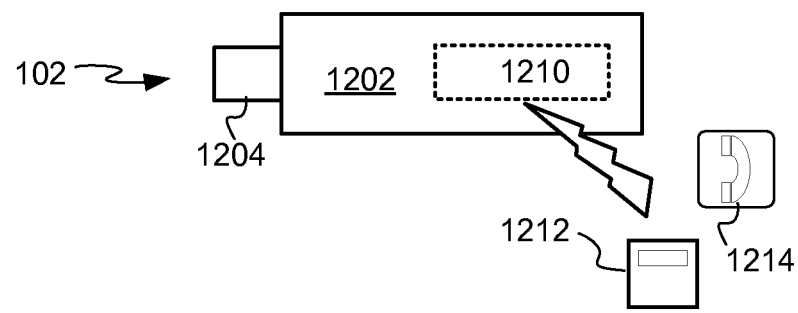

Referring now to FIGS. 12A-12C, therein are shown various alternate embodiments of the memory lock system 102 for use with the data security system 100 of FIG. 1 or the institutional data security system 900 of FIG. 9.

FIG. 12A is the memory lock system 102 having a body 1202 and a connector 1204. The body 1202 contains a display unit 1206 and a manipulable input mechanism 1208.

FIG. 12B shows the memory lock system 102 having the body 1202 and the connector 1204, but with no input mechanism, display, or any other exterior feature. This would be a USBD used within an institutional network system only.

FIG. 12C is the memory lock system 102 having the body 1202 and the connector 1204. The body 1202 has no exterior features, but is equipped with a radio frequency receiver 1210 for receiving radio frequency signals from a remote control 1212 or any other radio frequency device such as a cellphone 1214.

Figure 13:
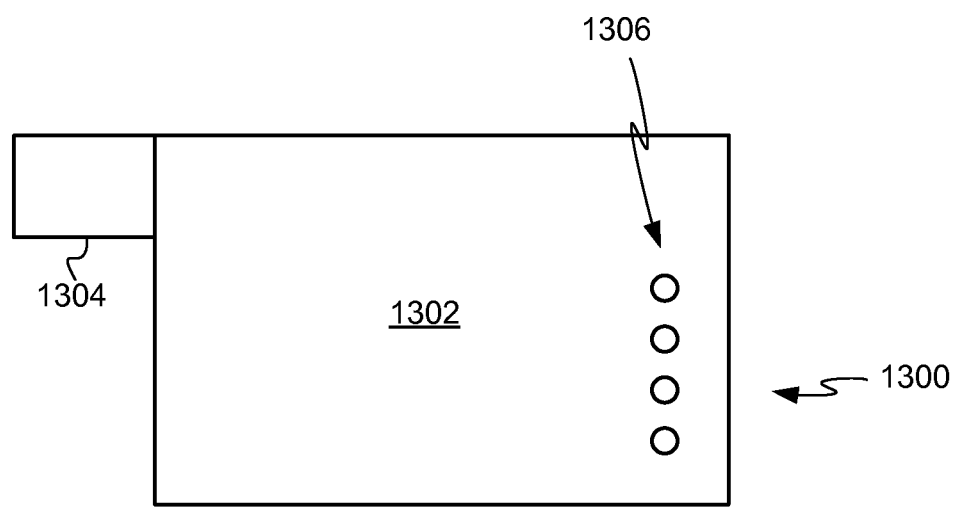
FIG. 13 is a credit card size memory lock system in an alternate embodiment of the present invention.

Referring now to FIG. 13, therein is shown a credit card size memory lock system 1300 in an alternate embodiment of the present invention. The credit card size memory lock system 1300 would have a body 1302 of the same thickness as a credit card and a connector 1304, which would similarly be thin and would be exposed. The body 1302, when provided with a manipulable input mechanism 1306, could have optical sensors, membrane switches, etc. The manipulable input mechanism 1306 is shown as optical sensors, which are through-hole or reflective types.

Figure 14:
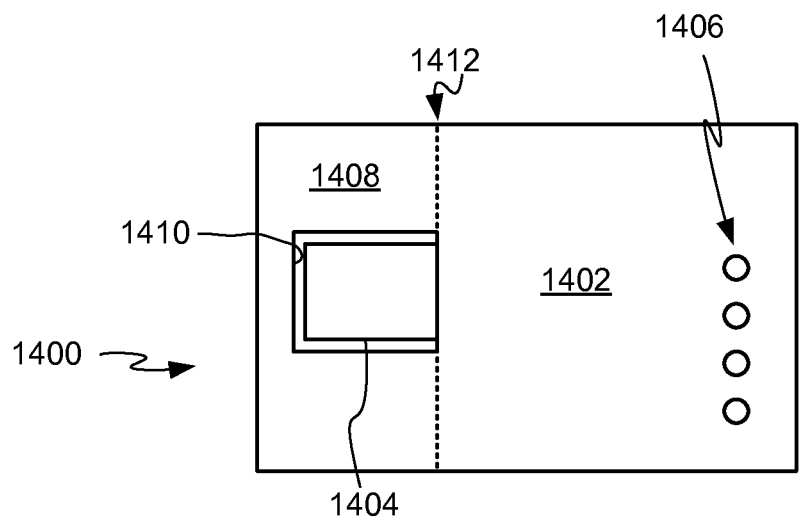
FIG. 14 is a credit card size memory lock system in an alternate embodiment of the present invention.

Referring now to FIG. 14, therein is shown a credit card size memory lock system 1400 in an alternate embodiment of the present invention. The credit card size memory lock system 1400 would have a body 1402 of the same thickness as a credit card and a connector 1404 would similarly be thin and would be exposed. The body 1402, when provided with a manipulable input mechanism 1406 could have optical sensors, membrane switches, etc.

The body 1402 further includes a protection cover 1408 for the connector 1404, which has a protective recess 1410 for covering the connector 1404 and which can be bent along a line 1412 to expose the connector 1404 for connection to a computer.

Figure 15:
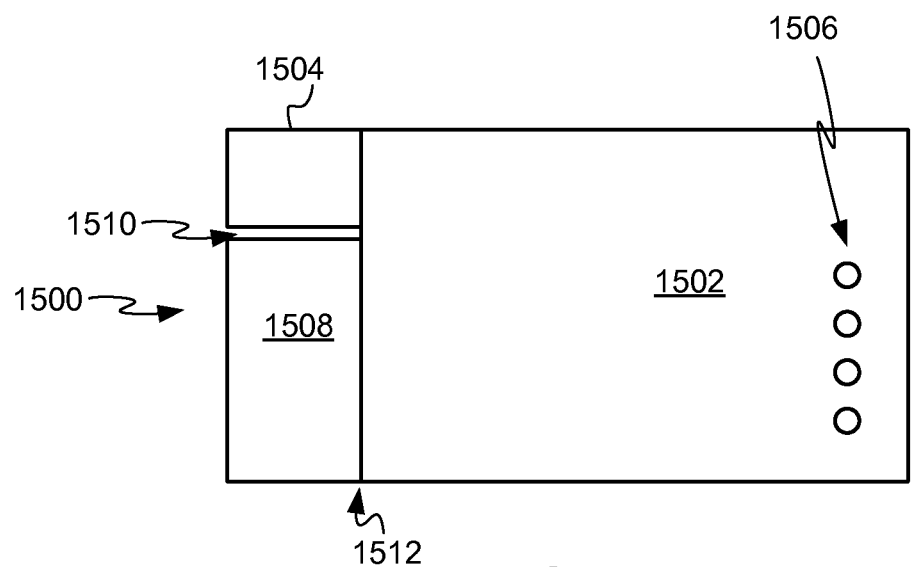
FIG. 15 is a credit card size memory lock system in an alternate embodiment of the present invention.

Referring now to FIG. 15, therein is shown a credit card size memory lock system 1500 in an alternate embodiment of the present invention. The credit card size memory lock system 1500 would have a body 1502 of the same thickness as a credit card and a USB connector 1504 would similarly be thin and would be exposed. The body 1502, when provided with a manipulable input mechanism 1506 could have optical sensors, membrane switches, etc.

The body 1502 further includes a protection cover 1508 for the USB connector 1504, which has a cutout 1510 for covering the USB connector 1504 and which can be bent along a line 1512 to expose the USB connector 1504.

Figure 16:
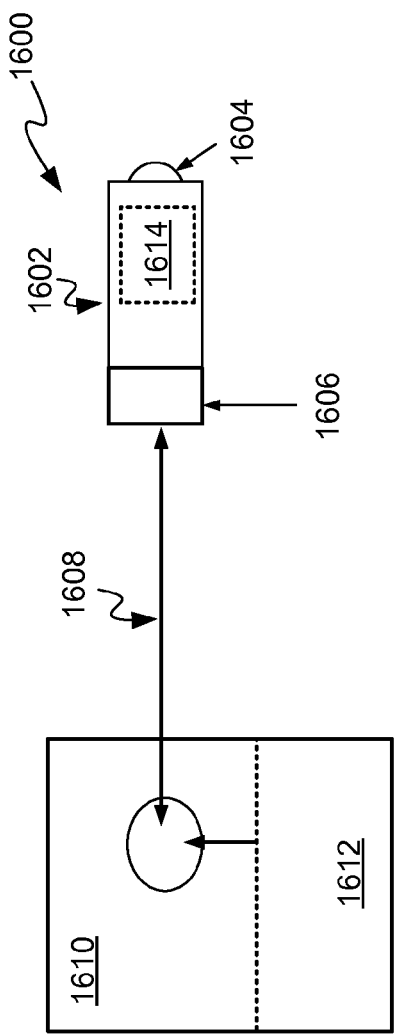
FIG. 16 is an intelligent data security system in an alternate embodiment of the present invention.

Referring now to FIG. 16, therein is shown an intelligent data security system 1600 in accordance with another embodiment of the present invention.

The intelligent data security system 1600 includes an intelligent memory lock system (IMLS) 1602. The intelligent memory lock system 1602 has a PIN entry mechanism 1604 and a connection controller 1606.

The PIN entry mechanism 1604 provides a means of entering a PIN or password for authentication. This is optional and is only required for user restrictions outside an institution.

The connection controller 1606 is a mixture of hardware and software that is able to exchange information with a host computer.

The intelligent data security system 1600 further includes an external connection 1608 connected to a host computer 1610. The host computer 1610 is the source of data that can be transferred to the intelligent memory lock system 1602. Data may reside locally in the host computer 1610 or remotely at an institution.

The host computer 1610 includes a connection authenticator 1612, which is a utility that interacts with the connection controller 1606 to perform authentication and allow access to memory 1614 in the intelligent memory lock system 1602.

The intelligent memory lock system 1602 can come equipped with the following security features for connection in the following predetermined configurations:

1. Single owner restricted to no computer—the intelligent memory lock system 1602 can only be opened by the owner via password or PIN. All information that flows onto the IMLS is encrypted and cannot be decrypted without the correct password or PIN entered in a PIN input mechanism 1604.
2. Single owner restricted to single computer—the intelligent memory lock system 1602 can only be accessed by one person on one computer. Access from any other computer is denied. There are 2 modes of authentication:
   A. Host generated ID based on login credentials.
   B. User enters password/PIN.
3. Single owner restricted to single network system—the intelligent memory lock system 1602 can be read on any computer within an established network system. There are 2 modes of authentication:
   A. Host generated ID based on login credentials.
   B. User enters password/PIN.
4. Multiple users restricted to single computer—the intelligent memory lock system 1602 can only be accessed from a single computer, but can be accessed by multiple users, as no PIN is required for authentication.
5. Multiple users restricted to single network system—the intelligent memory lock system 1602 can be can only be accessed from within predefined network system. No PIN authentication is necessary.
6. Multiple users with no restrictions—this is current level of security for most drives on the market.

The following table summarizes the possible embodiments.

| Restriction | Single User | Multiple Users |
|---|---|---|
| Computer | Unlocked via PIN or host | Unlocked via connected host |
| network | Unlocked via PIN or host | Unlocked via connected host |
| None | Unlocked via PIN | Always open |

Figure 17:
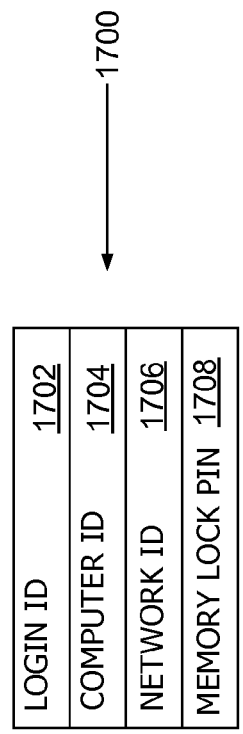
FIG. 17 is a restriction memory in the connection controller of FIG. 16 for equipping the intelligent memory lock system with the security features disclosed for FIG. 16.

Referring now to FIG. 17, therein is shown a restriction memory 1700 in the connection controller 1606 of FIG. 16 for equipping the intelligent memory lock system 1602 with the security features disclosed for FIG. 16.

The restriction memory 1700 includes: a Login ID 1702, a Computer ID 1704, a network ID 1706, and a memory lock PIN 1708.

Host Restriction

The following table shows the steps to set the intelligent memory lock system 1602 with multiple users to be restricted for use on a network system. This restricts the intelligent memory lock system (IMLS) environment while allowing multiple users.

| IMLS | Host |
|---|---|
| IMLS is connected to host | |
| IMLS attaches in limited capacity | |

| IMLS | Host |
|---|---|
| | Host queries for IMLS type |
| ID sent to host | |
| Restrictions sent to host | |
| | Identifier is created and encrypted |
| | Encrypted ID is sent to IMLS |
| ID is compared with IMLS stored ID | |
| If ID mismatch, IMLS shuts down | |
| Else, IMLS resets connection in fully functional state | |

The identifier is information that is unique to the network system but common to all computers that attach to the network system. Thus, if the above IMLS is connected outside the network system it will receive an incorrect ID and shut down.

If the IMLS is restricted to a single computer, then the identifier must be unique to the host computer.

User Restriction

The next table shows the steps to open a restricted IMLS with a single user. A user-restricted IMLS can only be opened by correct entry of a password or PIN.

| IMLS | User |
|---|---|
| IMLS is connected to host | |
| IMLS remains detached | |
| | User enters PIN |
| Correct PIN is verified in IMLS | |
| IMLS connects and is fully functional | |

Hybrid Restrictions

A combination of the preceding restrictions allows the IMLS to be unrestricted within a network system environment or, at the other extreme, restricted to a single user and a single computer.

For example, the IMLS can open anytime it attaches to the institutional network system but requires a PIN to gain access when outside. Here are the various permutations of features:

A) IMLS can be opened by a user with a correct PIN on a single computer.
B) IMLS can be opened by a user with a correct PIN on a single network system.
C) IMLS can be opened by a user with a correct PIN anywhere.
D) IMLS can be opened by multiple users on a single computer.
E) IMLS can be opened by multiple users on a single network system.
F) IMLS can be opened by multiple users anywhere (current off-the-shelf IMLSs)
G) IMLS opens anytime it is attached to a single computer with a specified user logged in—remains locked anywhere else.
H) IMLS opens anytime it is attached to the network system with a specified user logged in—remains locked outside the network system.
I) IMLS opens anytime it attaches within network system or computer system with a specified user logged in—requires PIN to access while outside.

In the last three configurations, the login process is enough to activate the IMLS. In this mode, the portable IMLS acts like any computer on an institutional network system. Typically, a person can move about the network system and use their login name and password to gain access. Since the network system has already performed verification, the IMLS checks the user name and grants access accordingly.

Unlocking Mechanism

There are 2 ways to unlock a restricted-use IMLS:
1. Entering a PIN via an external electromechanical input mechanism.
2. Host—IMLS pass-code exchange.

The first method is outlined above. The host-IMLS pass-code exchange is described below.

Setup

IMLS restrictions are defined during IMLS setup. This procedure is performed prior to IMLS being used for the $1^{st}$ time. The type of pass-code exchanged with the IMLS defines restrictions:

Login ID 1702—IMLS is tied to a specific user, when absent the IMLS can be used multiple users.

Computer ID 1704—IMLS can only be used on a specific computer. When absent, the IMLS can be used on any computer.

Network ID 1706—IMLS can be used on any computer within the network system. When absent, the IMLS can be used anywhere.

User PIN 1708—IMLS can be used on any computer when unlocked (requires IMLS). When absent, the IMLS can be used as defined by the previous settings without PIN entry.

These parameters are stored within the connection controller 1606 of the IMLS 1602. Restrictions are sent to the host computer 1610 at connection time. The connection authenticator 1612 responds by creating the appropriate pass-code in order to unlock.

User Restricted—authenticator creates an encrypted login ID of the user.
Computer Restricted—authenticator creates an encrypted computer ID.
Network Restricted—authenticator creates an encrypted network ID.

The connection authenticator 1612 may create more than one pass-code. For example, if the IMLS 1602 is restricted to a single user on a single computer, the connection authenticator 1612 creates the login ID 1702 and the network ID 1706. The computer ID 1704 is left blank.

If the IMLS 1602 can be used by multiple users within a network system but requires a PIN outside, the IMLS 1602 is used to facilitate PIN entry. The connection authenticator 1612 creates the network ID 1706 while inside. The login ID 1702 and computer ID 1704 are left blank. When outside the network system, a pass-code exchange will not take place, but correct PIN entry will enable the IMLS 1602.

Restrictions can be defined via the connection authenticator utility or by direct entry by an IMLS input mechanism as shown in FIG. 16.

A blank field indicates that no restriction exists at that level. Each field is manufactured in the blank state and configured by the customer.

Figure 18:
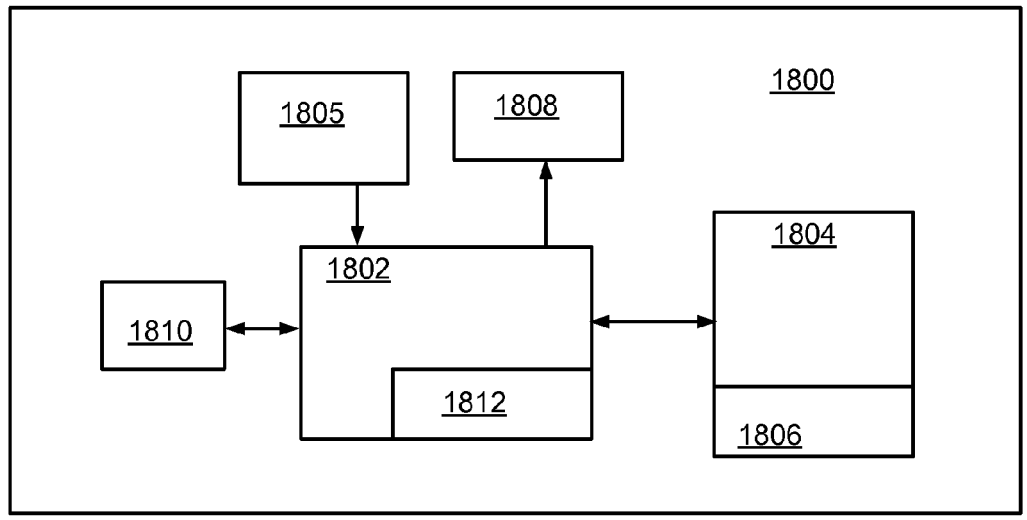
FIG. 18 is a secure authentication token system for the data security system of FIG. 1 in accordance with another embodiment of the present invention.

Referring now to FIG. 18, therein is shown a secure authentication token system 1800 for the data security system 100 of FIG. 1 in accordance with another embodiment of the present invention.

The secure authentication token system 1800 includes a central processing unit (CPU) 1802 connected to a memory 1804, which includes authentication software 1806. The CPU 1802 has connected to it a manipulable input mechanism 1805, a display unit 1808, and a connector 1810. The CPU 1802 further contains a dynamic password generator unit 1812.

The dynamic password generator unit 1812 is for generating a one-time password (OTP).

Figure 19:
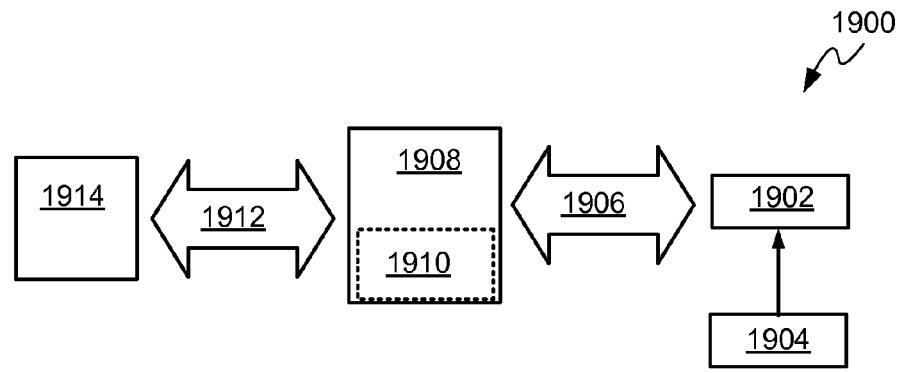
FIG. 19 is a schematic of the operation of the secure authentication token system of FIG. 18 in accordance with an embodiment of the present invention.

Referring now to FIG. 19, therein is shown a schematic 1900 of the operation of the secure authentication token system 1800 of FIG. 18 in accordance with an embodiment of the present invention. In the schematic 1900:

1. The user connects the secure authentication token system 1800 to the connector 1810 in a block 1902.
2. The user enters a PIN in a block 1904 using the manipulable input mechanism 1805 of the secure authentication token system 1800.
3. The secure authentication token system 1800 sends encrypted account information 1906 to a user computer 1908. Encrypted account information may also include an OTP.
4. An authentication application 1910 in the user computer 1908 then performs authentication 1912 with a remote host computer 1914.

It should be noted that the authentication application 1910 can be contained with the secure authentication token system 1800 or may be pre-installed on the user's computer 1908.

It should also be noted that PIN entry in the block 1904 could occur prior to computer connection in the case of a battery-powered secure authentication token system 1800.

Features of embodiments of the present invention include:
A. The secure authentication token system 1800 provides a mechanism for PIN input directly to the system.
B. The secure authentication token system 1800 provides storage for authentication software. This allows distribution of a single device that consists of both system and software.
C. The secure authentication token system 1800 provides an additional storage for the portable content, applications, OS, etc.

Figure 20:
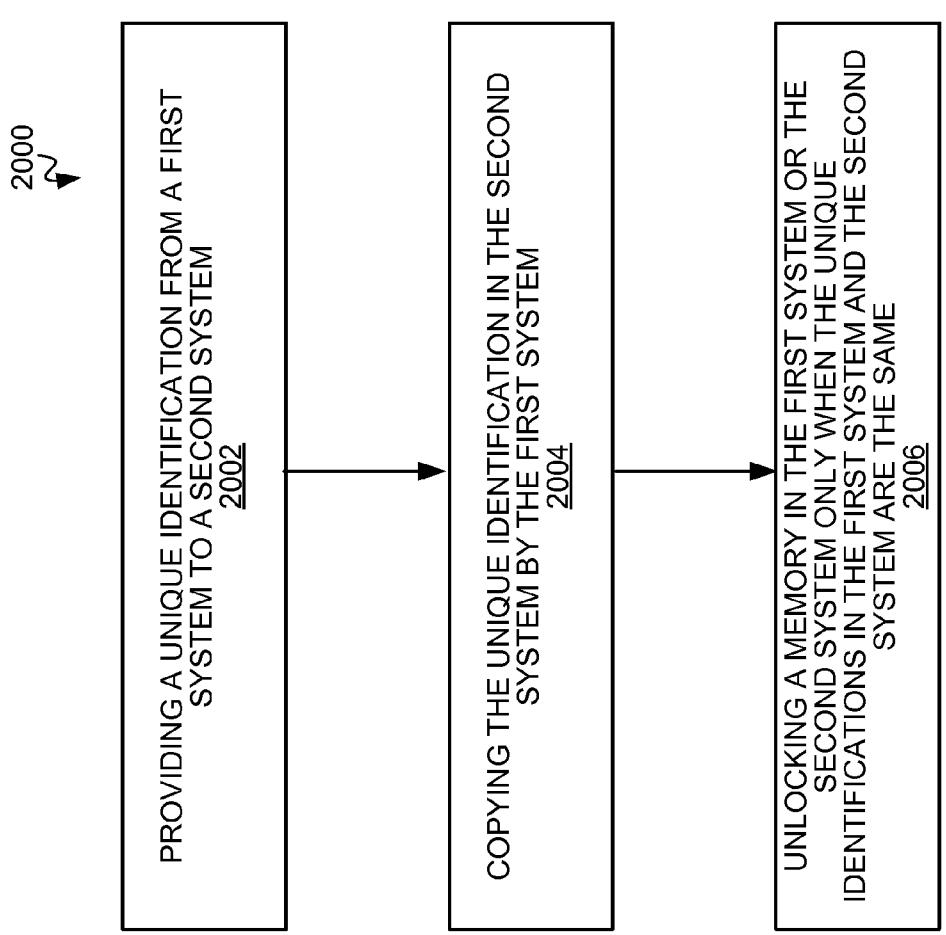
FIG. 20, therein is shown flow chart for a data security system in accordance with another embodiment of the present invention.

Referring now to FIG. 20, therein is shown flow chart for a data security system 2000 in accordance with another embodiment of the present invention.

The data security system 2000 includes providing a unique identification from a first system to a second system in a block 2002; copying the unique identification in the second system by the first system in a block 2004; and unlocking a memory in the first system or the second system only when the unique identifications in the first system and the second system are the same in a block 2006.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a data security system comprising:

copying a host identification from a host computer in a memory lock system;
generating a random seed from a random number generator unit in the memory lock system;
providing the host identification and the random seed to a hashing unit in the memory lock system to create a memory's hashed result;
providing the host identification and the random seed to a host application in the host computer to provide a host's hashed result;
disconnecting the memory lock system from the host computer;
connecting the memory lock system to the host computer to send the host's hashed result to the memory lock system to unlock a memory in the memory lock system when the memory's hashed result and the host's hashed result match;
entering a combination in the memory lock system for unlocking the memory; and
reconfiguring the combination to enter a new combination.

2. The method as claimed in claim 1 further comprising:
preventing unlocking the memory when more than a predetermined number of times of unsuccessful attempts have been made to unlock the memory.

3. The method as claimed in claim 1 further comprising:
providing the host identification from the host computer.

4. The method as claimed in claim 1 further comprising:
connecting a network system to the host computer; and
copying a network identification in place of the host identification into the memory lock system to marry the memory lock system to the network system.

5. The method as claimed in claim 1 further comprising:
sending encrypted information between the memory lock system and the host computer based on a correct combination entered into the memory lock system; and
authenticating the memory lock system or the host computer using the encrypted information; and
accessing a network system based on the authenticating.

6. The method as claimed in claim 1 further comprising:
unlocking the memory only when the memory lock system is connected to the host computer where the memory's hashed result and the host's hashed result match and a correct combination for unlocking the memory has been provided.

7. The method as claimed in claim 1 further comprising:
using the memory lock system in an institutional environment.

8. The method as claimed in claim 1 further comprising:
providing a controller in the memory lock system having a restriction memory for restricting unlocking of the memory to a user, a host computer, a network system, or a combination thereof.

9. The method as claimed in claim 1 wherein:
entering the combination includes entering the combination for unlocking the memory by physically manipulating a manipulable input mechanism for the memory lock system.

10. The method as claimed in claim 1 further comprising:
unlocking the memory upon provision of a dynamically generated a one-time password.

* * * * *